United States Patent
Gawrys

(10) Patent No.: US 11,319,006 B2
(45) Date of Patent: May 3, 2022

(54) SPIRAL DRIVE MECHANISM, PARTICULARLY FOR MECHANICAL VEHICLES, LAND AND MARINE MACHINES

(71) Applicant: Marek Gawrys, Serock (PL)

(72) Inventor: Marek Gawrys, Serock (PL)

( * ) Notice: Subject to any disclaimer, the term of this patent is extended or adjusted under 35 U.S.C. 154(b) by 739 days.

(21) Appl. No.: 16/071,914

(22) PCT Filed: Jan. 25, 2017

(86) PCT No.: PCT/PL2017/000003
§ 371 (c)(1),
(2) Date: Jul. 25, 2018

(87) PCT Pub. No.: WO2017/131538
PCT Pub. Date: Aug. 3, 2017

(65) Prior Publication Data
US 2020/0039591 A1    Feb. 6, 2020

(30) Foreign Application Priority Data

Jan. 27, 2016    (PL) .......................................... 415935

(51) Int. Cl.
| | | |
|---|---|---|
| B62D 57/036 | (2006.01) | |
| B60K 8/00 | (2006.01) | |
| B63H 1/12 | (2006.01) | |
| B60F 3/00 | (2006.01) | |
| B62D 57/024 | (2006.01) | |

(52) U.S. Cl.
CPC .......... *B62D 57/036* (2013.01); *B60F 3/0023* (2013.01); *B60K 8/00* (2013.01); *B63H 1/12* (2013.01); *B62D 57/024* (2013.01); *B63H 2001/127* (2013.01)

(58) Field of Classification Search
CPC ... B60F 3/0023; B62D 57/036; B62D 57/024; B63H 1/12; B63H 2001/122; B63H 2001/125; B63H 2001/127; B60K 8/00
See application file for complete search history.

(56) References Cited

U.S. PATENT DOCUMENTS

| | | | | |
|---|---|---|---|---|
| 3,333,563 A * | 8/1967 | De Bakker | .............. | B63H 1/38 |
| | | | | 440/12.65 |
| 3,682,127 A * | 8/1972 | Waquet | ..................... | B63B 1/14 |
| | | | | 440/12.65 |
| 4,867,716 A * | 9/1989 | McFarland | .............. | B63H 1/38 |
| | | | | 440/48 |
| 5,203,274 A * | 4/1993 | Hart | ...................... | B60F 3/0023 |
| | | | | 114/124 |
| 7,255,618 B2 * | 8/2007 | Leonov | .................. | A63H 17/26 |
| | | | | 180/7.2 |

* cited by examiner

*Primary Examiner* — Andrew Polay
(74) *Attorney, Agent, or Firm* — Andrzej Malarz, Esq.

(57) ABSTRACT

Spiral drive mechanism, particularly for mechanical vehicles, land and water machines, comprises of deformable spiral (1) of spindle shape, on one side resting on a rocker arm (2) with bearing, attached to the vehicle through a moving joint, through an axle (3) that moves the front part of the spiral in vertical, longitudinal and transverse axis. On the other side, it rests on a pendulum-moving driving axle of the vehicle (4), propelling rotating motion of the spiral and thus causing movement of the vehicle.

3 Claims, 6 Drawing Sheets

SPIRAL DRIVE MECHANISM, PARTICULARLY FOR MECHANICAL VEHICLES, LAND AND MARINE MACHINES

The subject of this invention is spiral drive mechanism, particularly for mechanical vehicles, land and marine machines, operating in difficult land and water conditions.

Vehicles equipped with multi-wheel, tracked, rolling drives with the purpose of increasing traction to the surface on which they drive are known. A roller drive employing a spiral permanently fixed on elongated solid steel shafts or shafts filled with fluid, driven along longitudinal axis in rotating motion from the engine, and cause movement of the vehicle; patent description US2005118903 (A1), RFN no. 1084149, RFN no. 810347 and from patent description PL 143236 concerning auxiliary drive of farming tractor. These drives facilitate movement of the vehicle on difficult ground, but they are not versatile drives capable of operating on land and in water. The downside of these drives is also their operation exclusively along the longitudinal axis of the vehicle, without the ability of changing their shape and length in order to adapt to land.

The purpose of the subject invention is obtaining an off-road drive, combining the features of wheel and tracked drives with high maneuverability, allowing to overcome natural obstacles in different environments.

Figure 1:
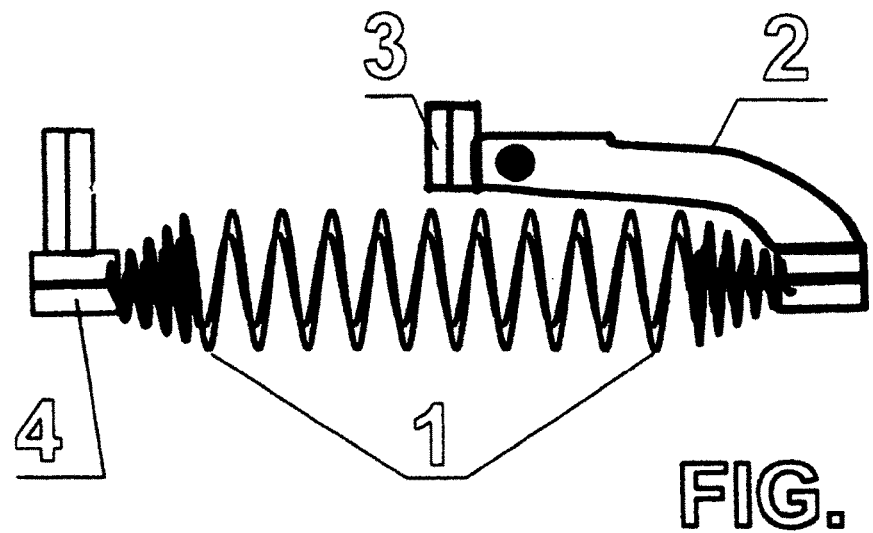

The invention consists in that the vehicle drive FIG. 1 is made in the form of a deformable spiral in the shape of a spindle, resting on one side on a rocker arm with bearing (2), which can be moved on a stationary axle (3) attached to the vehicle in vertical, horizontal and transverse axis. The spiral (1) in the back is driven by the drive axle (4), causing rotating motion along the longitudinal axis to the left or right, thus causing movement of the vehicle frontwards or backwards. It is preferred that the spiral drive is situated at both sides of the vehicle, thus forming a drive unit, ensuring stable movement of the vehicle frontwards and backwards (simultaneous rotation of both spirals in opposite directions) and perpendicularly to the side (simultaneous rotation of both spirals in the same direction). Movement of the front part of spiral (1) of the spiral drive mechanism in vertical axis facilitates crossing tall obstacles FIG. 9; FIG. 4; FIG. 5, movement of the spiral (1) in transverse axis causes turning of the vehicle in the same direction, FIG. 3, shortening of the drive spiral (1) in horizontal axis by pulling the front rocker arm (2) towards the drive axle (maximum pulling in of spiral ends) allows to obtain a full, spindle-shaped roll FIG. 2, that facilitates driving in quicksand. Elongation of the drive spiral (1) by movement of the front rocker arm (2) towards the front of the vehicle (movement of the spiral ends apart) causes increased spacing between the spirals of the drive spiral, (I), and facilitates driving in rocky or water environment.

Figure 6:
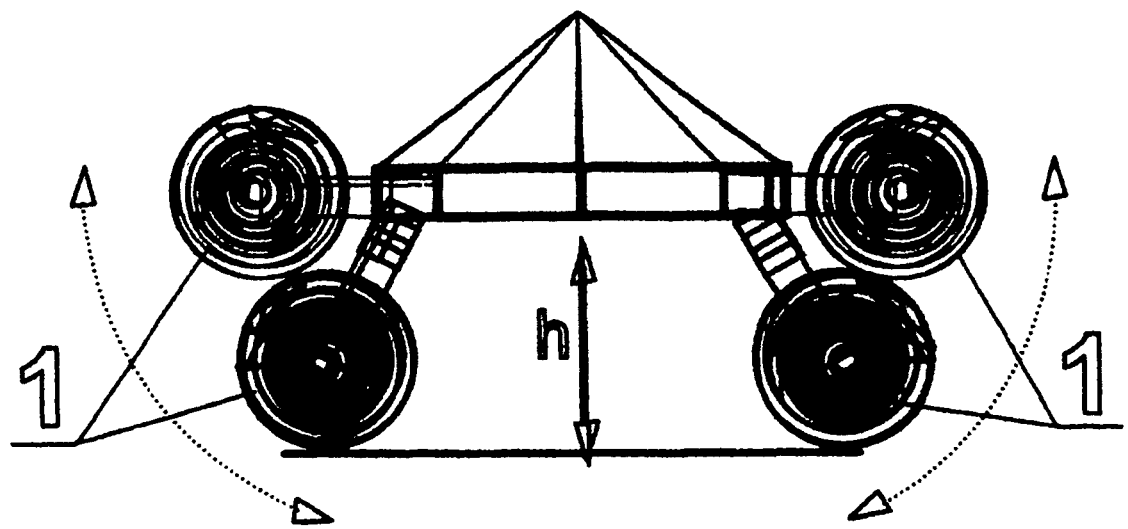
Figure 7:
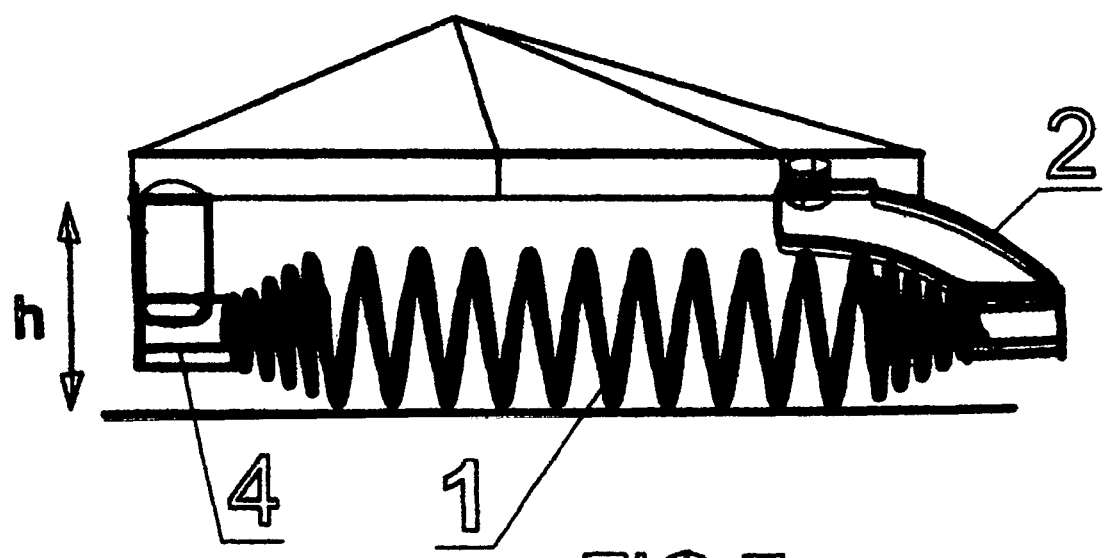

Rotation of the front rocker (2), drive axle (4), or both simultaneously along the longitudinal axis of the vehicle by pressing of the spiral (1) on the ground causes lifting of the vehicle for the purpose of facilitating the crossing of obstacles FIG. 6, FIG. 7.

The subject of invention is presented in embodiment on the figure, where

Figure 1A:
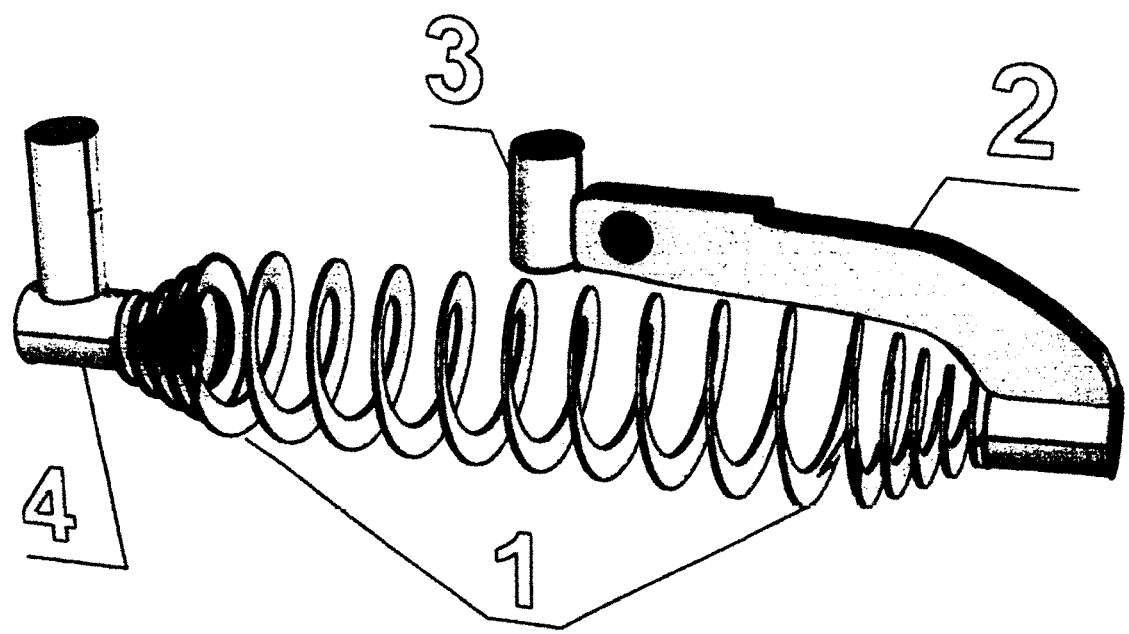
Figure 2:
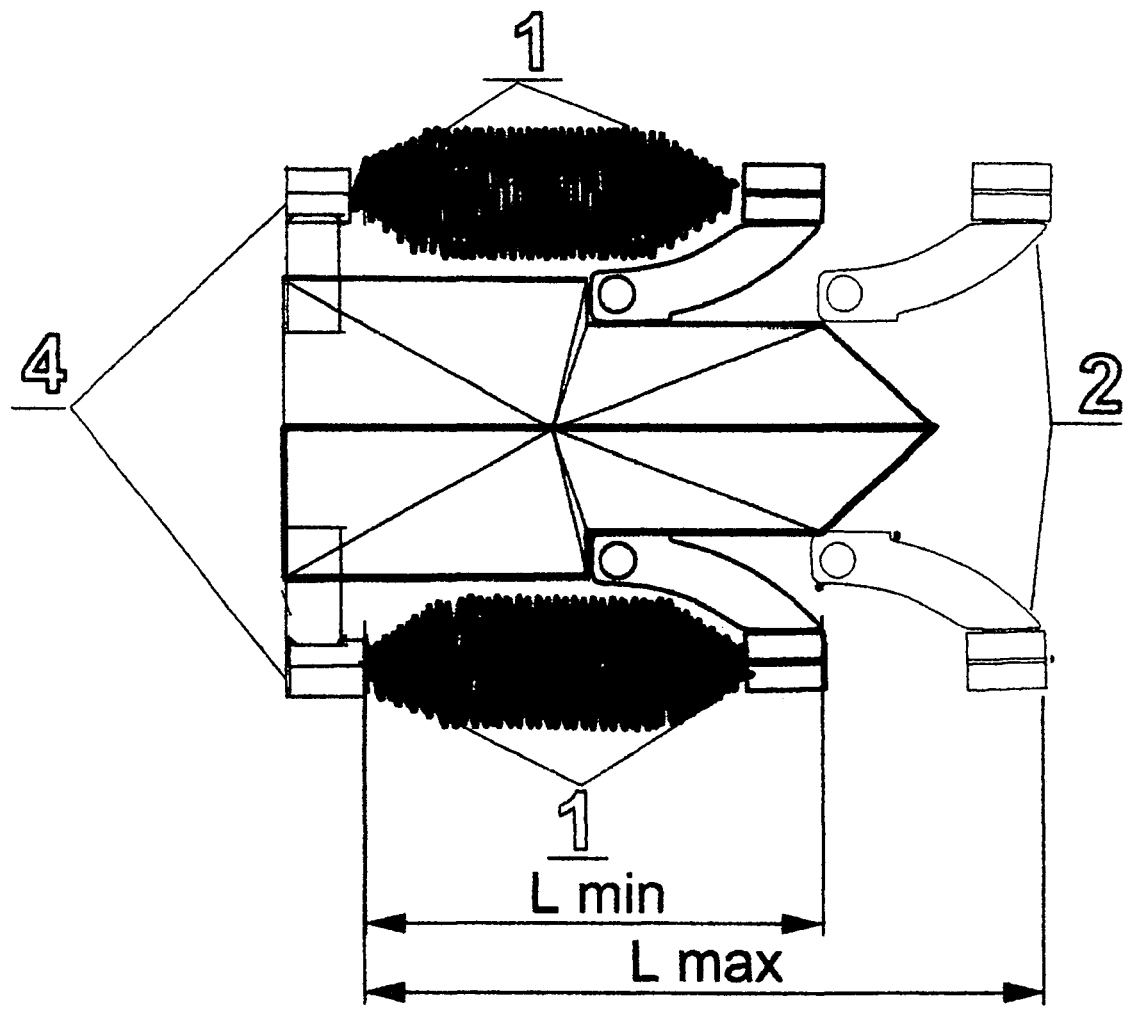
Figure 3:
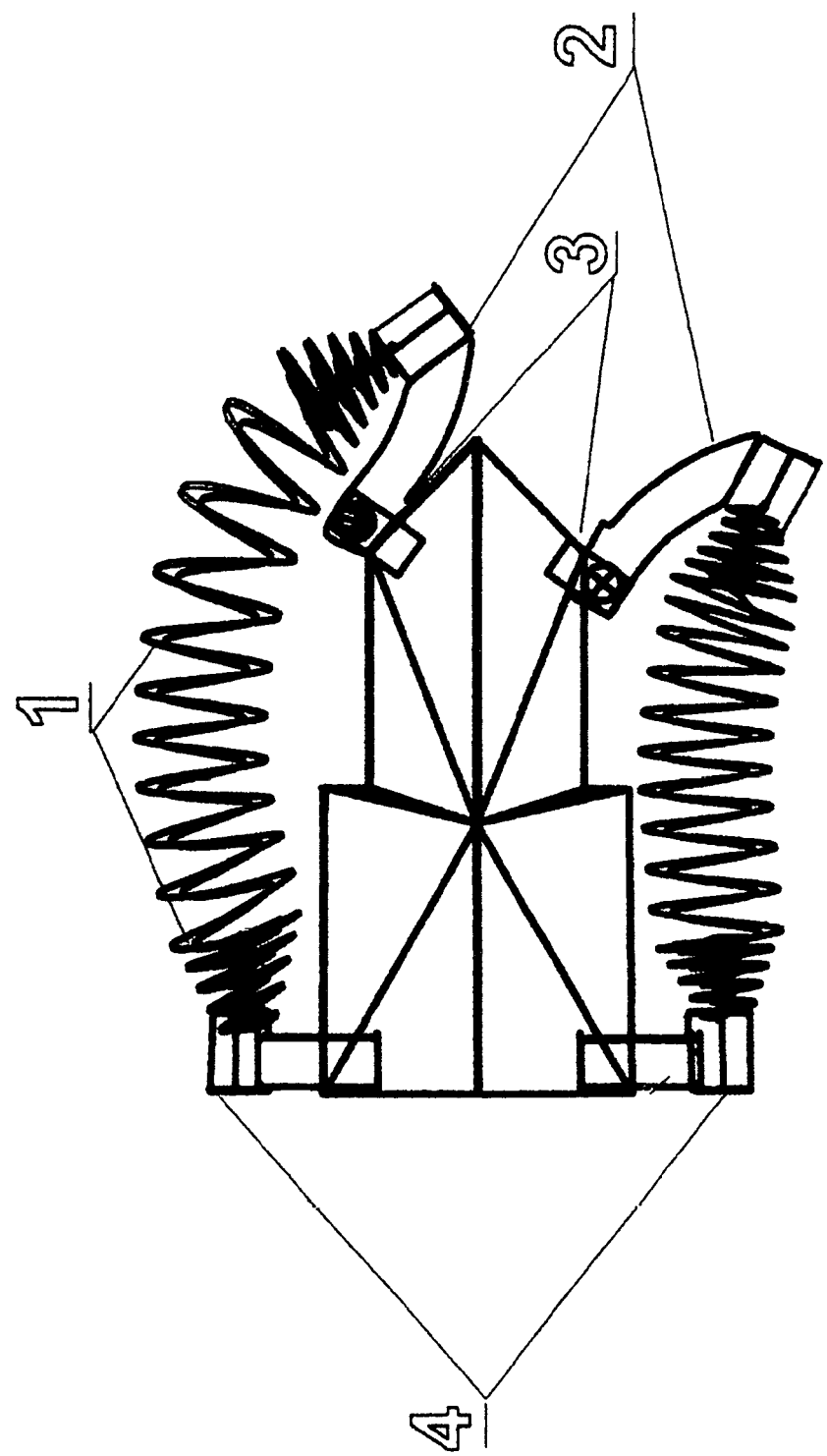
Figure 4:
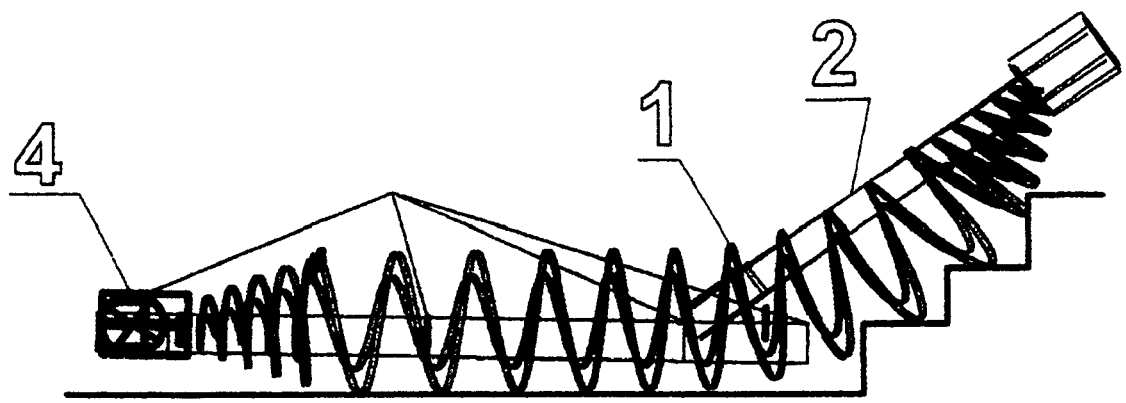
Figure 5:
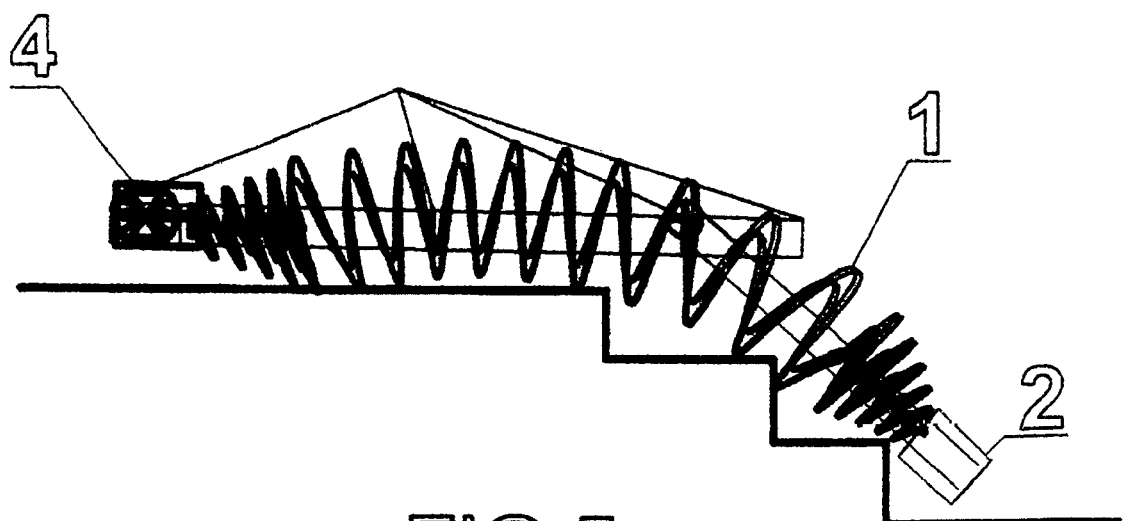
Figure 8:
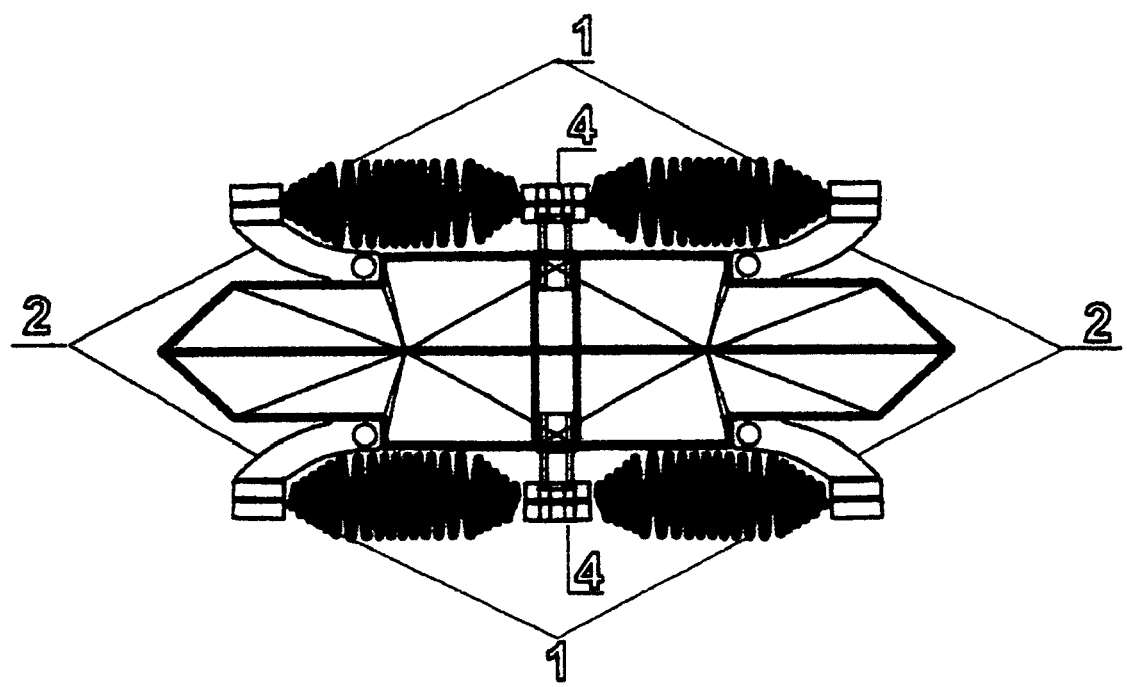
Figure 9:
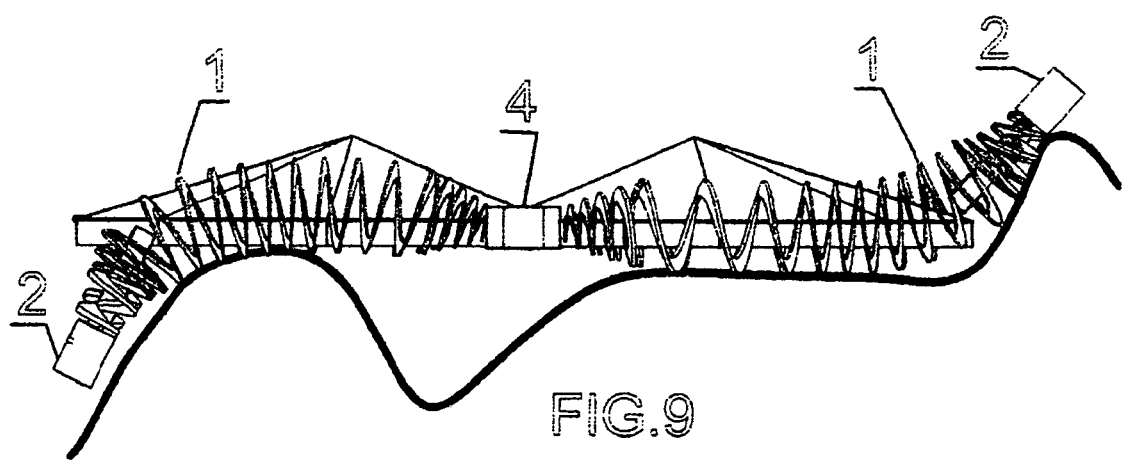

FIG. 1 presents the top view of the drive, and FIG. 1*a* presents the perspective view, FIG. 2 presents view from the top of the vehicle, with rocker arms shortened and spirals set as rollers, FIG. 3 shows the turning of the drive in transverse axis, from the top, FIG. 4 and FIG. 5 shows the side view of operation of the drive, moved in vertical axis, FIG. 6, shows the front view, and FIG. 7, shows the side view of lifting and lowering of the vehicle through oscillatory rotation of the drives in longitudinal axis of the vehicle, FIG. 8 shows the top view of vehicle with multiplied spiral drive, FIG. 9 shows the side view of vehicle with multiplied spiral drive.

The benefit of the invented solution is that a vehicle equipped with a spiral drive, through elongation of the deformable spiral (1), FIG. 2 or movement of its front part in horizontal plane FIG. 3 or vertical plane FIG. 4; FIG. 5, FIG. 9 is able to adapt to land in such way that optimum parameters of the vehicle movement on various grounds, including: rocks, sand, ice, water, stairs, construction obstacles are ensured. Rotation of the entire spiral drive along the longitudinal axis of the vehicle, upwards or downwards, causes lifting or lowering of the vehicle relative to the ground FIG. 6, FIG. 7. Elongation of the driving spiral (1), FIG. 2 causes increased spacing between its coils, and the resulting increase in speed of the vehicle, or the ability to cross large rocks, stairs, or pulling of the vehicle up on obstacles. Maximum pulling in of the drive spiral (1) towards the operator (maximum shortening) allows to obtain a full roller, which allows for horizontal driving on even, asphalt surfaces with higher speed, similar to wheeled vehicles, or driving in sandy ground or quicksand.

It is preferred that the spiral drive is multiplied FIG. 8 in order to increase traction, causing increased ability to overcome land obstacles, and increased maneuverability of the vehicle FIG. 9.

The invention claimed is:

1. A spiral drive mechanism, particularly for mechanical vehicles, land and water machines, wherein the deformable drive spiral of spindle shape (1) rests on one side on a rocker arm (2) with bearing, wherein the rocker arm is attached to the vehicle through a moving joint (3), which directs the location of the beginning of the spiral relative to the vehicle in longitudinal, vertical and transverse axis, and on the other side, the spiral (1) is attached to the driving axle of the engine (4), installed to the vehicle through a pendulous joint in its longitudinal axis, which propels the rotary motion of the spiral (1) in its longitudinal axis, constituting the drive of the vehicle.

2. The spiral drive mechanism, particularly for mechanical vehicles, land and water machines, assembled, according to claim 1, wherein it consists of multiple spiral drives operating independently in longitudinal axis of the vehicle, inverted relative to each other by 180 degrees, with the driving axles (4) towards each other, and situated in assemblies at both sides of the vehicles.

3. The spiral drive mechanism, particularly for mechanical vehicles land and water machines, according to claim 1, wherein the bearing rocker (2) attached to the vehicle through the moving joint (3), rotating along the longitudinal axis of the vehicle, presses onto the ground through the spiral (1), lifting the vehicle and being independent from the drive axle, rotating along the transverse axis of the vehicle (4).

* * * * *